US012325466B2

United States Patent
Colmont et al.

(10) Patent No.: US 12,325,466 B2
(45) Date of Patent: Jun. 10, 2025

(54) STRUCTURAL NODE FOR A MOTOR VEHICLE FRONT LOWER LOAD PATH, AND PROCESS FOR ASSEMBLING SAID STRUCTURAL NODE

(71) Applicant: ArcelorMittal, Luxembourg (LU)

(72) Inventors: Jean-Louis Colmont, Cergy (FR); Thierry Derchu, Bar-le-Duc (FR); Edith Lahellec, Sarry (FR)

(73) Assignee: ArcelorMittal, Luxembourg (LU)

( * ) Notice: Subject to any disclaimer, the term of this patent is extended or adjusted under 35 U.S.C. 154(b) by 365 days.

(21) Appl. No.: 17/918,685

(22) PCT Filed: Apr. 20, 2020

(86) PCT No.: PCT/IB2020/053718
§ 371 (c)(1),
(2) Date: Oct. 13, 2022

(87) PCT Pub. No.: WO2021/214514
PCT Pub. Date: Oct. 28, 2021

(65) Prior Publication Data
US 2023/0347981 A1 Nov. 2, 2023

(51) Int. Cl.
*B62D 21/15* (2006.01)
*B62D 21/02* (2006.01)
*B62D 27/02* (2006.01)

(52) U.S. Cl.
CPC ........... *B62D 21/155* (2013.01); *B62D 21/02* (2013.01); *B62D 27/023* (2013.01)

(58) Field of Classification Search
CPC ....... B60R 19/34; B60R 19/04; B60R 19/023; B62D 21/155; B62D 21/152; B62D 21/02;
(Continued)

(56) References Cited

U.S. PATENT DOCUMENTS 7,066,509 B2 * 6/2006 Kollaritsch ............. B60R 19/34
293/133
8,899,642 B2 * 12/2014 Kosaka ................... B60R 19/26
293/133
(Continued)

FOREIGN PATENT DOCUMENTS

DE 102004032802 2/2006
DE 102004032802 A1 * 2/2006 ............. B60R 19/24
(Continued)

OTHER PUBLICATIONS

Search Report of PCT/IB2020/053718 filed Jan. 20, 2021 and International Report on Patentability.

*Primary Examiner* — Amy R Weisberg
*Assistant Examiner* — Wenwei Zhuo
(74) *Attorney, Agent, or Firm* — Davidson Kappel LLC

(57) ABSTRACT

A structural components node (9) a crash box connector (14) and a crash extender connector (13) each having a top plate extending in a substantially horizontal plane and allowing to secure directly together the crash extender (7) and the crash box (8). Advantageously, the structural components node (9) can further optionally include connections with a hanger (10) and a front transverse member (11). It is possible to reduce the amount of welding operations needed to assemble the structural components node (9) and to provide a robust structural components node (9) ensuring a high structural strength to the assembly and an efficient cooperation between the lower and middle load paths and between the left and right side of the vehicle in case of a front impact. A process of assembling such a structural components node (9) is also provided.

12 Claims, 6 Drawing Sheets

(58) Field of Classification Search
CPC ... B62D 27/023; B62D 25/082; B62D 25/085
USPC ........ 296/187.09, 187.1, 29, 203.02, 193.09;
293/132, 133, 146, 151, 154, 155
See application file for complete search history.

(56) References Cited

U.S. PATENT DOCUMENTS

| | | | |
|---|---|---|---|
| 9,168,883 | B1 | 10/2015 | Midoun et al. |
| 9,809,254 | B2 * | 11/2017 | De Leo ................. B62D 27/02 |
| 11,230,240 | B2 * | 1/2022 | Eklund ................ B62D 21/155 |
| 2006/0249962 | A1 * | 11/2006 | Gonzalez ............... B60R 19/34 |
| | | | 293/133 |
| 2015/0061307 | A1 * | 3/2015 | Nakanishi ................ F16F 7/12 |
| | | | 293/133 |
| 2015/0251613 | A1 * | 9/2015 | Mori .................... B62D 21/152 |
| | | | 293/133 |
| 2015/0343973 | A1 * | 12/2015 | Stoenescu ............... B60R 19/12 |
| | | | 293/133 |
| 2016/0059810 | A1 * | 3/2016 | Watanabe ............ B62D 25/082 |
| | | | 293/133 |
| 2017/0088183 | A1 | 3/2017 | Yamada et al. |
| 2018/0244225 | A1 * | 8/2018 | Nakayama .............. B60R 19/24 |
| 2018/0273098 | A1 | 9/2018 | Komiya et al. |
| 2018/0339732 | A1 * | 11/2018 | Takii ..................... B62D 21/02 |

FOREIGN PATENT DOCUMENTS

| | | | |
|---|---|---|---|
| FR | 2971980 | A1 | 8/2012 |
| JP | 2001301649 | A | 10/2001 |
| JP | 2011255815 | A | 12/2011 |
| JP | 2015217898 | A | 12/2015 |

* cited by examiner

STRUCTURAL NODE FOR A MOTOR VEHICLE FRONT LOWER LOAD PATH, AND PROCESS FOR ASSEMBLING SAID STRUCTURAL NODE

The present invention relates to a structural node for a motor vehicle front lower load path, and to the process for assembling said structural node.

The front part of a vehicle plays an essential role in protecting the occupants of the vehicle in case of impact, especially during a frontal impact. The front part of a vehicle must be able to guarantee the safety of the occupants by participating in shock absorption (absorption and dissipation of the forces created by the impact) and by minimizing the intrusion into the passenger compartment.

BACKGROUND

The behavior of the front part of the vehicle during impacts is subject to requirements described in a standardized way by the different national and regional vehicle safety assessment agencies. Such requirements are constantly reinforced to ensure an ever-better safety of the occupants and to ensure that all the possible configurations taking place during a real-life front impact are indeed taken into account during the conception of the vehicle. For example, in recent years, a new series of front impacts tests are designed to simulate the case of a front impact which only spans part of the width of the vehicle. Such tests have been spearheaded by the American Insurance Institute for Highway Safety's (IIHS's) small overlap rigid barrier (SORB). We also see an emerging generation of crash tests, which factor in the damage made not only to the considered vehicle but also to the partner vehicle in case of a vehicle to vehicle head on collision. This is for example the case of the new European regulation test involving a mobile progressive deformable barrier (MPDB).

SUMMARY OF THE INVENTION

Alongside the ever-increasing requirements of crash tests, the current evolution towards electric vehicles, hybrid vehicles and fuel-cell vehicles tends to increase the overall weight of the vehicles because of the heavy battery packs and other equipment, which increases the kinetic energy to be absorbed during impact. The front structure of a vehicle is therefore ever more challenged to absorb and resist high loads during a front crash.

To improve the behavior of the front part, in particular in case of high-speed impact, it is advantageous to configure this front part so as to distribute the forces created during an impact along several load paths. Recent vehicle conceptions address the issue of distributing the shock energy in case of a front impact to the vehicle by providing an upper, middle and lower load path, distributed along the height of the vehicle. By doing so, the shock energy is picked up, at least partially absorbed and then distributed to the rest of the vehicle structural elements through six load paths in case of a full front impact involving both sides of the vehicle and through three load paths in case of a partial overlap impact such as the small overlap rigid barrier (SORB) of the American Insurance Institute for Highway Safety (IIHS). The current invention focuses on the front part of the lower load path of a vehicle, and more particularly the node connecting the lower load path to the middle load path.

Referring to FIG. 1 which illustrates the middle and lower load paths of the front part 1 of a vehicle of the prior art, the middle load path 2 generally comprises two front rails 3 (only one front rail is visible on FIG. 1) extending in a longitudinal direction XX' of the vehicle, and a bumper beam assembly 4, attached to said front rails 3.

The lower load path 5 generally includes a suspension cradle 6 from which are connected two opposite crash extenders 7o. These crash extenders 7o are longitudinally connected to two opposite crash boxes 8o whose front end 8oa are secured to a transverse cross-member 12. The crash extenders 7o are configured to pick up the remaining crash energy after absorption by the crash boxes 80, to absorb part of the energy themselves by deforming and to transmit the remaining energy to the suspension cradle 6. A further transverse cross-member 11 is configured to increase the structural strength of the overall lower load path assembly and to promote cooperation between the two sides of the vehicle during an impact. This last role being particularly important in case of a partial overlap impact, such as the previously described SORB crash test.

At the front of the vehicle, the lower and middle load paths are connected on each side by a vertical hanger 10. The vertical hanger 10 has the role of reinforcing the structural assembly of the front part of the vehicle and of ensuring good cooperation between the lower and middle load paths in case of an impact.

On each side, the junction between the crash extender 7o, the crash box 8oa, the transverse cross-member 11 and the hanger 10 forms a structural component node 9o. The left and right structural component nodes 9o are linked together by the transverse cross-member 11. One example of a structural component node 9o of the prior art is given on FIG. 2.

Besides their obvious structural utility in the mechanical strength of the lower load path 5, the two structural component nodes 90 play a fundamental role in promoting the cooperation of the different elements of the lower load path 5 and the middle load path 2 during a front impact. First of all, by connecting the two crash extenders 70 together via the transverse front cross member 11, it ensures that even in the case when only one of the two crash extenders 70 faces the impactor, such as for example in the case of the Small Overlap Rigid Barrier (SORB) crash test, the other elongated cross member 70 comes into play to diffuse the energy of the shock. Also, by connecting the lower load path 5 and the middle load path 2, via the vertical hangers 10, it ensures that both load paths work together in absorbing crash energy.

Referring to FIG. 2, the crash extender 7o of the prior art comprises a hollow body 7o1 delimited by a top wall 7o11, a lower opposite wall 7o12 and two opposite transverse walls 7o14, 7o13, as well as a rear end 7ob. The front end 7oa of said crash extender 7o is secured to a connector 13o able to be attached to the corresponding structural component node 9o.

The crash extender connector 13o comprises a top plate 13o1 which is in surface contact with the top wall 7o11 of the hollow body 7o1 of the crash extender 7o, a lower plate 13o2 in surface contact with the lower wall 7o12 of the hollow body 7o1 of the crash extender 70, and two opposite transverse plates 13o3, 13o4 defining with the opposite transverse walls 7o13, 7o14 of the hollow body 7o1 of the crash extender 7o two opposite locking volumes 14a, 14b, each locking volume 14a, 14b being able to receive at least one fastening device, for example a bolt and nut assembly (not illustrated on FIG. 2) crossing the top plate 7o11 and the lower plate 7o12 of the crash extender connector 13o for securing said crash extender connector 13o and then the crash extender 7o to the hanger 10 (not illustrated) which extends perpendicularly to the top plate 13o1 of the crash extender connector 13o and whose lower end is in surface contact on said top plate 13o1. The opposite locking volumes 14a, 14b and their associated fasteners are also able to secure the transverse front cross member 11 not illustrated on this figure.

The crash extender connector 13o further comprises a front plate 13o5 able to be secured to a cooperating connector (not illustrated) at a rear end 8ob of the crash box 8o (see FIG. 1).

When assembling the structure component node 9o, the crash extender 7o, the crash box 8o and the transverse front cross member 11 are secured together by means of the fasteners crossing the opposite locking volumes 14a, 14b of the crash extender connector 13o, and the crash extender 7o is secured to the crash box 8o by means of the front plate 13o5 of the crash extender connector 13o.

Such assembling involves fasteners and connecting plates that lead to increase the total weight of the vehicle. Moreover, such assembling involves a subsequent number and length of welds that lead to increase both the assembling time for the operators and the manufacturing costs. Finally, the connections between the connectors and the elements of the structure component node 9o can lead to weaknesses during a frontal impact.

A system for the simplified assembly of a crash box and a crash extender has been proposed in patent application DE102004032802. Said system however does not allow to further integrate into the structure component node a further transverse element, such as the transverse front cross member 11 or a vertical element such as the hanger 10.

It is an object of the present disclosure to provide a crash extender with its connector, a crash box with its connector and a structural components node comprising said parts that allows to simplify the assembly operations, to reduce the number of parts involved, to increase the manufacturing productivity and to provide a robust structural components node ensuring good mechanical strength of the assembly and efficient cooperation of the load paths in case of a crash.

To this end, the present invention relates to a structural components node comprising at least a crash box extending longitudinally from a front end able to be secured to a transverse cross-member to a rear end, and a crash extender extending from a rear end able to be secured to a suspension cradle to a front end secured to at least said crash box, said crash extender comprising a hollow body delimited by a top wall, a lower opposite wall and two opposite transverse walls, the rear end of the crash box comprising a crash box connector comprising a rear plate facing the front free edge of the hollow body of the crash extender, and a top plate which is substantially perpendicular to said rear plate and in surface contact on and secured to a cooperating top plate of a crash extender connector located at the front end of said crash extender, the top plate of the crash extender connector being in surface contact on the top wall of the hollow body of the crash extender, the crash extender connector further comprising a lower plate in surface contact with the lower wall of the hollow body of the crash extender.

According to other optional features of the structural components node according to the invention, considered alone or according to any possible technical combination:

The crash extender connector comprises two opposite transverse plates defining with the corresponding opposite transverse walls of the hollow body of the crash extender two opposite locking volumes, each locking volume receiving at least one fastening device crossing at least the top plate of the crash box connector, and the top plate and the lower plate of the crash extender connector.

The crash extender connector further comprises a front plate which is substantially perpendicular to its top plate, which faces the rear free edge of the hollow body of the crash extender and which is in surface contact on the rear plate of the crash box connector.

The front plate of the crash extender connector comprises at least one securing tab which extends in the same plane as said front plate beyond the lower wall of the hollow body of the crash extender, said securing tab being in surface contact with and secured to a cooperating securing tab which extends in the same plane as the rear plate of the crash box connector.

The securing tabs of both the crash extender connector and the crash box connector each comprise at least one coaxial hollowing-out receiving one fastening device crossing and securing both securing tabs.

The structural components node further comprises a hanger extending perpendicular to both top plates of the corresponding crash extender connector and crash box connector, from a top end able to be secured to a front rail, to a lower end comprising a lower plate in surface contact with and secured to said two top plates.

The structural components node further comprises a transverse front cross member extending substantially perpendicular to the crash box, the crash extender and the hanger, from a first lateral end able to be secured to a second structural components node located at the lateral opposite side of the motor vehicle lower load path, to a second opposite lateral end comprising an ending plate in surface contact with and secured to the lower plate of the crash extender connector.

The two opposite locking volumes of the crash extender connector receive at least one fastening device crossing and securing the top plate of the crash box connector, the top plate and the lower plate of the crash extender connector, the lower plate of the lower end of the hanger and the ending plate of the lateral end of the transverse front cross member.

The current invention further relates to a process for assembling a structural components node, comprising:
providing and positioning a transverse front cross member,
providing and positioning a rear end of a crash extender in a suspension cradle, and a lower plate of a crash extender connector close to an ending plate of a lateral end of said transverse front cross member,
providing and positioning a lower plate of a lower end of a hanger close to a top plate of the crash extender connector,
pre-fastening the crash extender connector, the lower plate of the lower end of the hanger and the ending plate of the lateral end of the transverse front cross member with fastening devices extending through two opposite locking volumes of the crash extender connector,
providing and positioning a crash box connector close to the crash extender connector, a top plate of said crash box connector being located between the lower plate of the lower end of the hanger and the top plate of the crash extender connector, and
fastening the crash extender connector, the lower plate of the lower end of the hanger, the ending plate of the lateral end of the transverse front cross member and the crash box connector with the fastening devices extending through the two opposite locking volumes of the crash extender connector.

According to an optional feature of the assembly process according to the invention, the process further comprises fastening securing tabs of the crash extender connector and of the crash box connector.

The invention further relates to a motor vehicle comprising at least one structural components node as described above and to a motor vehicle comprising two opposite structural components nodes as described above, each located at the lateral opposite side of the motor vehicle lower load path.

Other characteristics and advantages of the invention will be described in greater detail in the following description.

BRIEF DESCRIPTION OF THE DRAWINGS

The invention will be better understood by reading the following description, which is provided purely for purposes of explanation and is in no way intended to be restrictive, with reference to.

DETAILED DESCRIPTION

It should be noted that the terms "lower", "top", "vertical", "horizontal", "front", "rear" and "back" as used in this application refer to the positions and orientations of the different parts of the crash extender, crash box and structural components node when these pieces are in their assembled position on the motor vehicle.

It should be noted that the term "substantially perpendicular" refers to an angle of 90°+/−15°, i.e. an angle between 75° and 105°. The terms "substantially horizontal" and "substantially vertical" refer respectively to an orientation which has an angle of 0°+/−15° compared to the horizontal plane and 0°+/−15° compared to the vertical plane.

The main characteristic of the invention is to provide a structural components node comprising a crash box connector and a crash extender connector each having a top plate extending in a substantially horizontal plane and allowing to secure directly together the crash extender and the crash box. Advantageously, said structural components node can further optionally comprise connections with the hanger and the front transverse member. By applying the invention, it is possible to reduce the amount of welding operations needed to assemble said structural components node and to provide a robust structural components node ensuring a high structural strength to the assembly and an efficient cooperation between the lower and middle load paths and between the left and right side of the vehicle in case of a front impact.

Figure 1:
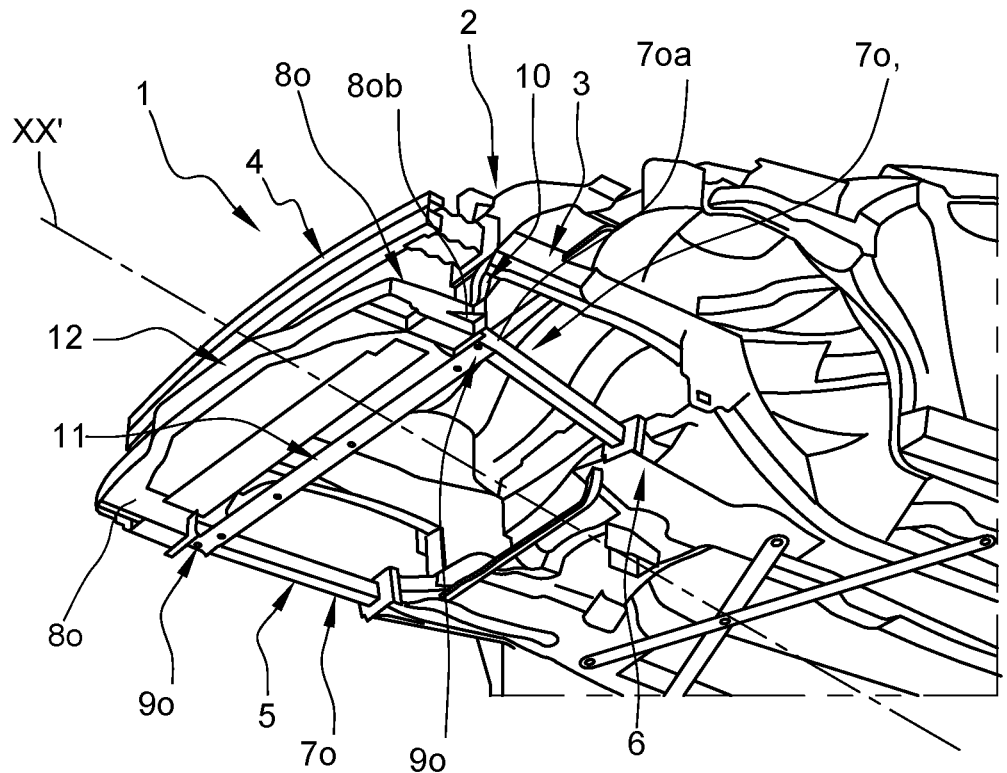
FIG. 1, which has already been described, is a lower perspective view of the middle and the lower load paths of the front part of a vehicle of the prior art, FIG. 2, which has already been described, is a perspective view of a crash extender with its connector of the prior art.
Figure 3:
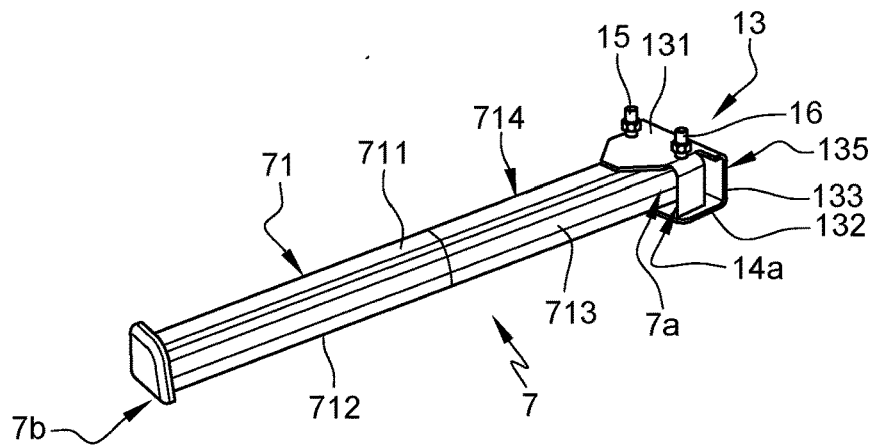
FIG. 3 is a perspective view of a crash extender with its connector according to a first embodiment of the invention.
Figure 4:
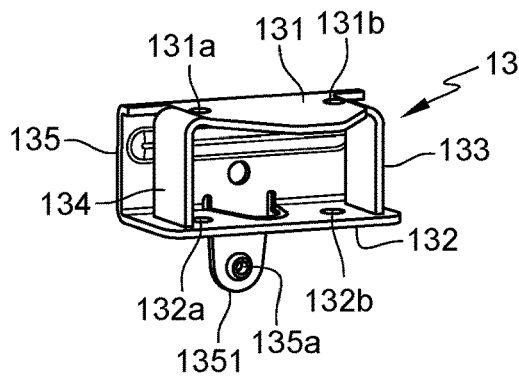
FIG. 4 is a perspective view of the crash extender connector of the crash extender of the first embodiment of the invention.

We refer to FIGS. 3 to 9 for describing the first embodiment of the invention. Referring first to FIGS. 3 and 4, as for the prior art, the crash extender 7 of the invention is intended to extend from a rear end 7b able to be secured to a suspension cradle 6 (FIG. 1) to a front end 7a able to be secured to the crash box 8 of the invention (see, e.g, FIGS. 5 and 6) and more specifically to the crash box connector 14.

The crash extender 7 comprises a hollow body 71 delimited by a top wall 711, a lower opposite wall 712 and two opposite transverse walls 713, 714. The crash extender connector 13 is secured to the front end 7a of the crash extender 7. The crash extender connector 13 comprises a top plate 131 which is in surface contact with the top wall 711 of the hollow body 71, a lower plate 132 in surface contact with the lower wall 712 of the hollow body 71 of the crash extender 7, and two opposite transverse plates 133, 134 (see also FIG. 4) defining with the opposite transverse walls 713, 714 of the hollow body 71 two opposite locking volumes 14a, 14b (see FIG. 8), each locking volume 14a, 14b receiving one fastening device 15, 16, such as for example a bolt and nut assembly, whose functionalities will be explained further. Each top plate 131 and lower plate 132 of the crash extender connector 13 comprises a set of two hollowing-outs facing each other 131a, 131b; 132a, 132b each opening into the corresponding locking volume 14a, 14b and through which the corresponding fastening device 15, 16 extends from the top plate 131 to the lower plate 132. In this embodiment, the hollowing-outs 131a, 131b; 132a, 132b are holes but could also be notches extending towards the opposite transverse plates 133, 134.

In this embodiment, the crash extender connector 13 further comprises a front plate 135 substantially perpendicular to its top plate 131 and facing the front free edge of the hollow body 71 of the crash extender 7. The front plate 135 comprises one securing tab 1351 which extends in the same plane as the front plate 135 beyond the lower wall 712 of the hollow body 71 of the crash extender 7. The securing tab 1351 (see FIG. 6) comprises a hollowing-out 135a receiving a fastening device 18 (FIG. 9), such as a bolt and nut assembly, to ensure a better securing efficiency between the crash extender connector 13 and the crash box connector 14, as will be explained in further detail later on. In this embodiment, the hollowing-out 135a is a hole but could also be a notch.

Figure 5:
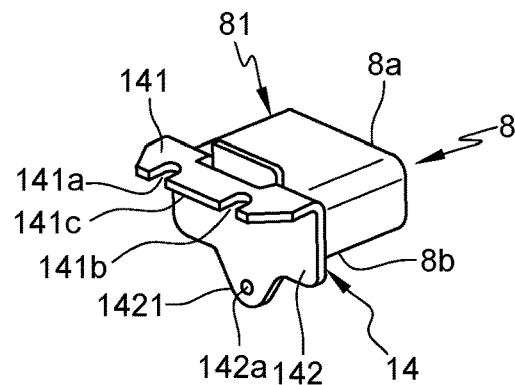
FIG. 5 is a perspective view of the crash box connector of the crash box of the invention.
Figure 6:
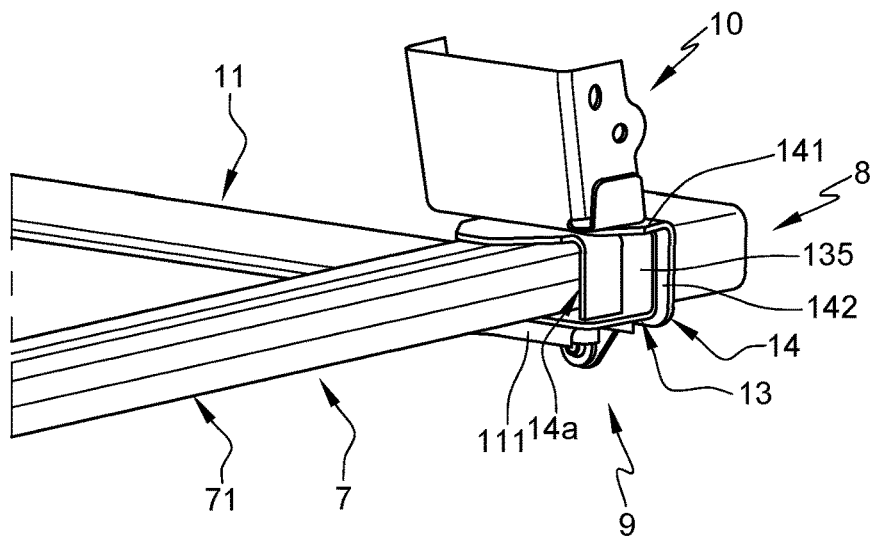
FIG. 6 is a rear perspective view of the structural components node of the first embodiment of the invention.
Figure 7:
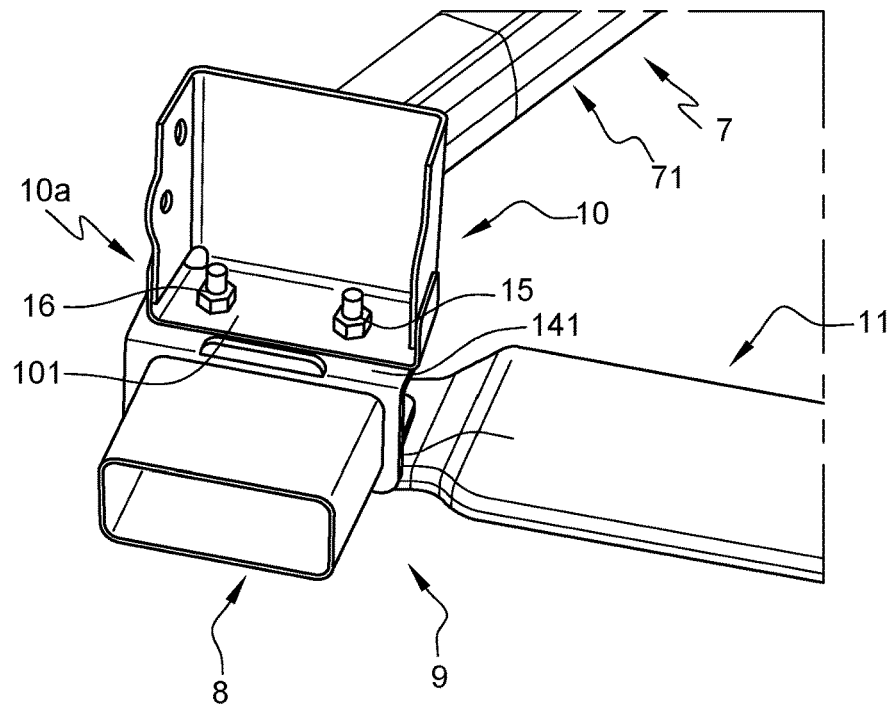
FIG. 7 is a front perspective view from above of the structural components node of the first embodiment of the invention.

Referring to FIG. 5, the crash box 8 of the invention is intended to extend from a front end 8a able to be secured to the transverse cross-member 12 (see FIG. 1), to a rear end 8b able to be secured to the crash extender 7 more specifically to the crash extender connector 13. The crash box 8 comprises a hollow body 81 delimited by a top wall, a lower opposite wall and two opposite transverse walls. The crash box connector 14 is secured to the rear end 8*b* of the crash box 8.

The crash box connector 14 comprises a rear plate 142 in surface contact with the front plate 135 of the crash extender connector 13 when the crash box connector 14 and the crash extender connector 13 are secured together, and a top plate 141 substantially perpendicular to said rear plate 142 and in surface contact with the top plate 131 of the crash extender connector 13 when the crash box connector 14 and the crash extender connector 13 are secured together.

The top plate 141 of the crash box connector 14 comprises two hollowing-outs 141*a*, 141*b* configured to be aligned with the cooperating holes 131*a*, 131*b* of the top plate of the crash extender connector 13 when the crash box connector 14 and the crash extender connector 13 are secured together. In this embodiment, the hollowing-outs 141*a*, 141*b* are notches for being adapted to an assembling process wherein the hanger 10 is assembled to the node 9 before the crash box 8. Considering another assembling process, the hollowing-outs 141*a*, 141*b* could be holes.

The notches 141*a*, 141*b* of the top plate 141 of the crash box connector 14 are then able to receive the respective fastening devices 15, 16 (FIG. 9) to secure the crash extender 7, the crash box 8, the hanger 10 and the front cross member 11 together as will be described in more details further. The notches 141*a*, 141*b* are located on the free front edge 141*c* of the top plate 141 of the absorption element connector 14 and open towards the rear, for reasons that will be explained when detailing the assembly process to form the resulting structural components node.

Figure 8:
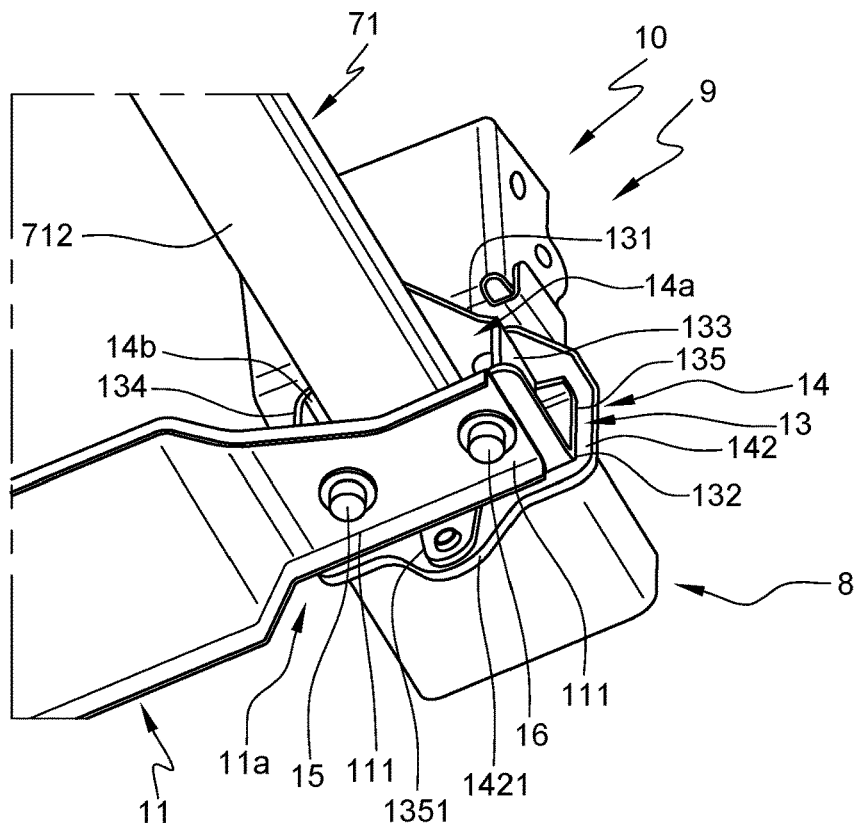
FIG. 8 is a rear perspective view from below of the structural components node of the first embodiment of the invention.

The rear plate 142 of the crash box 14 comprises a securing tab 1421 which extends in the same plane as said rear plate 142 and which is in surface contact with the securing tab 1351 of the crash extender connector 13 (see, e.g., FIG. 8).

The securing tab 1421 comprises a hollowing-out 142*a* whose location is configured to be aligned with the cooperating hole 135*a* of the securing tab 1351 of the crash extender connector 13 when the crash box connector 14 and the crash extender connector 13 are secured together (see, e.g, FIG. 5). In this embodiment, the hollowing-out 142*a* is a hole but could also be a notch. The hole 142*a* of the securing tab 1421 is thus able to accommodate the fastening device 18 (FIG. 9) and thus ensure an additional fastening between the crash extender connector 13 and the crash box connector 14, on top of the already described fastening devices 15 and 16.

This additional fastening location is particularly advantageous, because it secures together the two securing tabs 1351 and 1421, which are oriented substantially perpendicular to the longitudinal direction of the vehicle. The already described fastening locations corresponding to the fastening devices 15 and 16 secure the top plates 131 and 141 together. Said top plates are oriented substantially parallel to the longitudinal direction of the vehicle. In case of a front crash, the impact force will be substantially parallel to the longitudinal direction of the vehicle. The impact force will thus have a tendency to force the top plates 131 and 141 to slide relative to one another, whereas it will have a tendency to push the securing tabs 1351 and 1421 on to one another. As a result, the impact force will exert a severe strain on the fastening devices 15 and 16, which will need to resist the sliding effect, whereas said impact force will actually strengthen the assembly between the securing tabs 1351 and 1421. The presence of said tabs and of the fastening device 18 therefore reinforces the strength of the assembly between the energy absorption device 8 and the crash extender 7 in case of a front impact. It therefore ensures better behavior of the vehicle upon impact and helps protecting the occupants of the vehicle.

The same reasoning as above can also be applied in the specific case of a small overlap rigid barrier (SORB) front crash, in which only one side of the vehicle is impacted. In this case, the impacted side will be directly submitted to the impact force, with the effects described in the preceding paragraph. On the other hand, the crash extender/crash box assembly located on the opposite side of the vehicle will not be directly submitted to the impact force, but rather to a torsional moment having a substantially vertical axis resulting from the movement of the transverse front cross member 12 and/or the movement of the front cross member 11 under the influence of the impact force. In this case also, the two top plates 131 and 141 will tend to slide relative to one another under the influence of said torsional moment. On the other hand, the securing tabs 1351 and 1421 will once again be pushed one against the other. As a result, the presence of the securing tabs and the additional fastening device 18 also strengthen the assembly in case of a SORB type crash on both sides of the vehicle.

The structural components node 9 is described in reference to FIGS. 6 to 9. The structural components node 9 comprises the crash extender 7 already described and the crash box 8 already described. The structural components node 9 also comprises the hanger 10 extending substantially perpendicularly to both top plates 131, 141 of the corresponding crash extender connector 13 and crash box connector 14, from a top end not illustrated able to be secured to a front rail 3 (FIG. 1), to a lower end 10*a* comprising a lower plate 101 in surface contact with the top plate 141 of the crash box connector 14. The structural components node 9 further comprises the transverse front cross member 11 extending substantially perpendicular to the crash box 8, the crash extender 13 and the hanger 10 from a first lateral end not illustrated able to be secured to a second structural components node 9 located at the lateral opposite side of the motor vehicle lower load path, to a second opposite lateral end 11*a* comprising an ending plate 111 in surface contact with the lower plate 132 of the crash extender connector 13.

In the structural components node 9 of the invention, the crash box connector 14 is assembled against the crash extender connector 13. The lower face of the top plate 141 of the crash box connector 14 is then in surface contact with the top face of the top plate 131 of the crash extender connector 13, and the front face of the front plate 142 of the crash box connector 14 is in surface contact on the rear face of the rear plate 135 of the crash extender connector 13. In this structural components node 9, the lower face of the lower plate 101 of the hanger 10 is in surface contact with the top face of the top plate 141 of the crash box connector 14. Finally, the top face of the ending plate 111 of the transverse front cross member 11 is in surface contact with the lower face of the lower plate 132 of the crash extender connector 13. The crash extender connector 13 is sandwiched between the ending plate 111 of the transverse front cross member 11 and the top plate 141 of the crash box connector 14, this later being sandwiched between the top plate 131 of the crash extender connector 13 and the lower plate 101 of the hanger 10.

The lower plate 101 of the hanger 10 comprises two holes 19 (FIG. 9) configured to be aligned with the two notches 141*a*, 141*b* of the crash box connector 14 and the two holes 131*a*, 131*b* of the top plate 131 of the crash extender connector 13. Similarly, the ending plate 111 of the transverse front cross member 11 also comprises two holes 20 (FIG. 9) configured to be facing the two holes 132a, 132b of the lower plate 132 of the crash extender connector 13.

Figure 9:
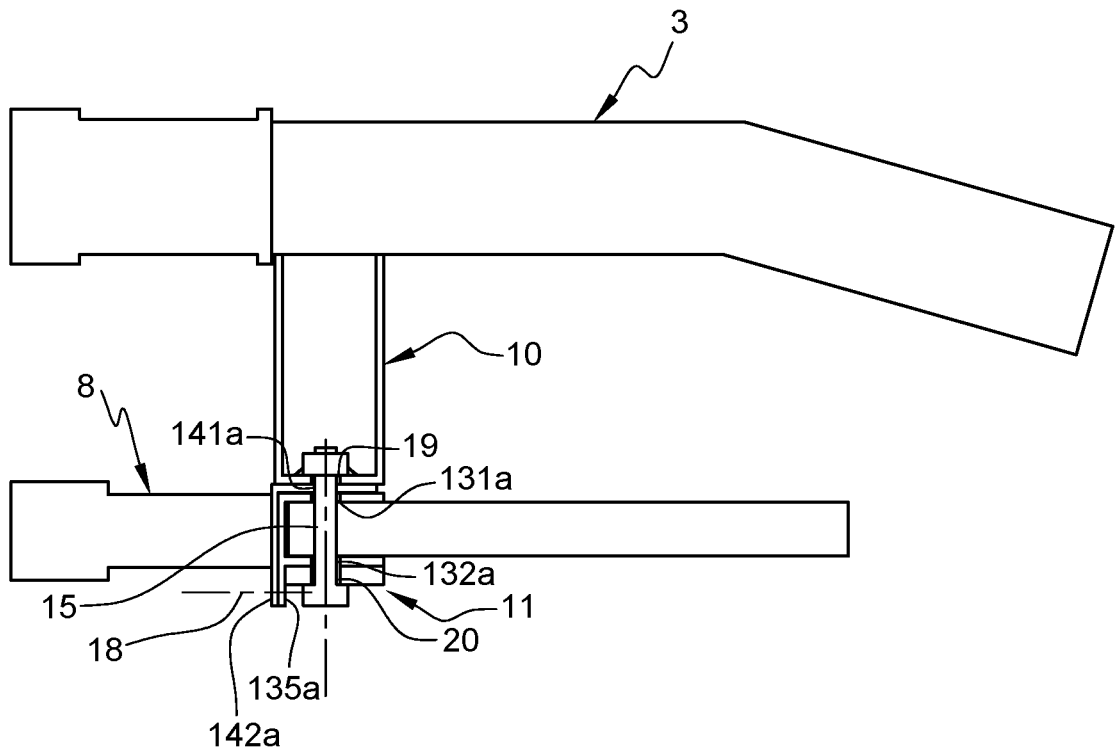
FIG. 9 is a longitudinal cross section view of the structural components node of the first embodiment of the invention.

The four elements are secured together by the two fastening devices 15, 16 which are inserted through the holes 19 of the lower plate 101 of the hanger 10, the notches 141a, 141b of the top plate 141 of the crash box connector 14, the holes 131a, 131b of the top plate 131 of the crash extender connector 13, the opposite locking volumes 14a, 14b of the crash extender connector 13, the holes 132a, 132b of the lower plate 132 of the crash extender connector 13 and the holes 20 of the ending plate 111 of the transverse front cross member 11. Said fastening devices 15, 16 exert a substantially horizontal compression force to maintain the assembly of the four elements. As will be well understood, in a particular embodiment, further holes, notches and fastening devices can be considered to further reinforce the assembly of the four elements. The crash box connector 14 and the crash extender connector 13 are further secured together with the fastening device 18 crossing the hole 142a of the securing tab 1421 of the crash box connector 14 and the hole 135a of the securing tab 1351 of the crash extender connector 13 (FIG. 9).

Thanks to the crash extender 7 of the invention and to the crash box 8 of the invention, a minimum of only two fastening devices is needed to secure the four pieces involved in the structural components node 9. The fastening device 18 allows to better secure the crash extender 7 of the invention and he crash box 8. This requirement for a minimum of only two fastening devices mainly results from the top plate 131 of the crash extender connector 13 and the top plate 141 of crash box connector 14, which both allow to secure the crash extender 7 with the crash box 8 and also the hanger 10.

Figure 2:
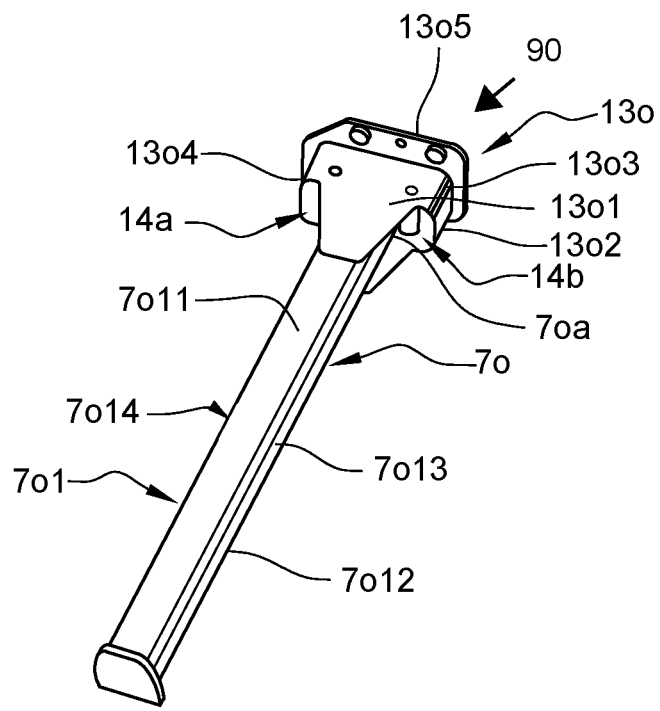

Moreover, the crash extender 7 of the invention and the crash box 8 of the invention involve a weld length at least three times less than for the crash extender of the state of the art of FIG. 2, and a weight reduction of about 500 grams.

The process of the invention for assembling the above described structural components node 9, comprises the following steps:
  providing and positioning the transverse front cross member 11,
  providing and positioning the rear end 7b of the crash extender 7 in the suspension cradle 6, and the lower plate 132 of the crash extender connector 13 close to the ending plate 111 of the transverse front cross member 11,
  providing and positioning the lower plate 101 of the lower end 10a of the hanger 10 close to the top plate 131 of the crash extender connector 13,
  pre-fastening the crash extender connector 13, the lower plate 101 of the lower end 10a of the hanger 10 and the ending plate 111 of the transverse front cross member 11 with the fastening devices 15, 16 by inserting them through the holes 19, 131a/131b, the locking volumes 14a, 14b and the holes 132a/132b and the holes 20. By pre-fastening, it is meant that the compressive force exerted by the fastening devices 15 and 16 on the assembly is sufficient to secure it together for the purpose of the subsequent assembly steps, while being sufficiently low to allow for the insertion of the crash box connector 14 as will be subsequently described,
  providing and positioning the crash box connector 14 close to the crash extender connector 13, the top plate 141 of said crash box connector 14 being located between the lower plate 101 of the lower end 10a of the hanger 10 and the top plate 131 of the crash extender connector 13, such insertion being possible thanks to the open configuration of the notches 141a, 141b which allows said notches to surround the fastening devices 15, 16 still in place thanks to the pre-fastening operation, completing the assembly of the structural components node 9 by increasing the compressive force exerted by the fastening devices 15, 16.
  the respective securing tabs 1351, 1421 of the crash extender connector 13 and the crash box connector 14 are then secured by fastening them with the fastening device 18.

The above described assembly process of the invention involves significantly less steps as the process of the prior art since the securing of the hanger 10, the crash extender connector 13 and the crash box connector 14 is carried out simultaneously in a single operation. Furthermore, the above described assembly process of the invention involves significantly less welding operations then decreasing both the duration and the costs of the process.

Figure 10:
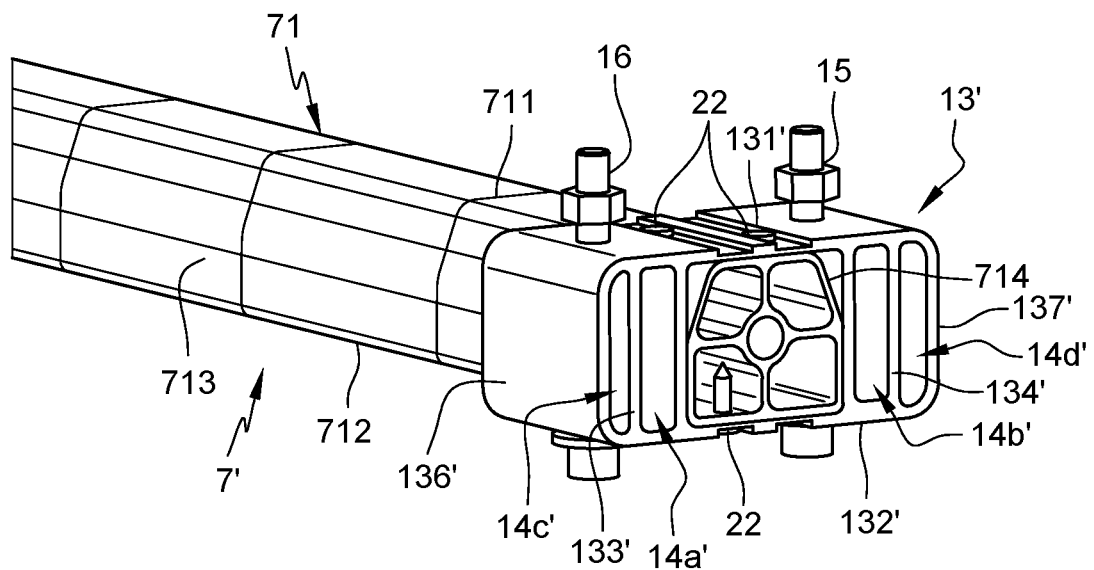
FIG. 10 is a perspective view of the front end of a crash extender with its connector according to a second embodiment of the invention.
Figure 11:
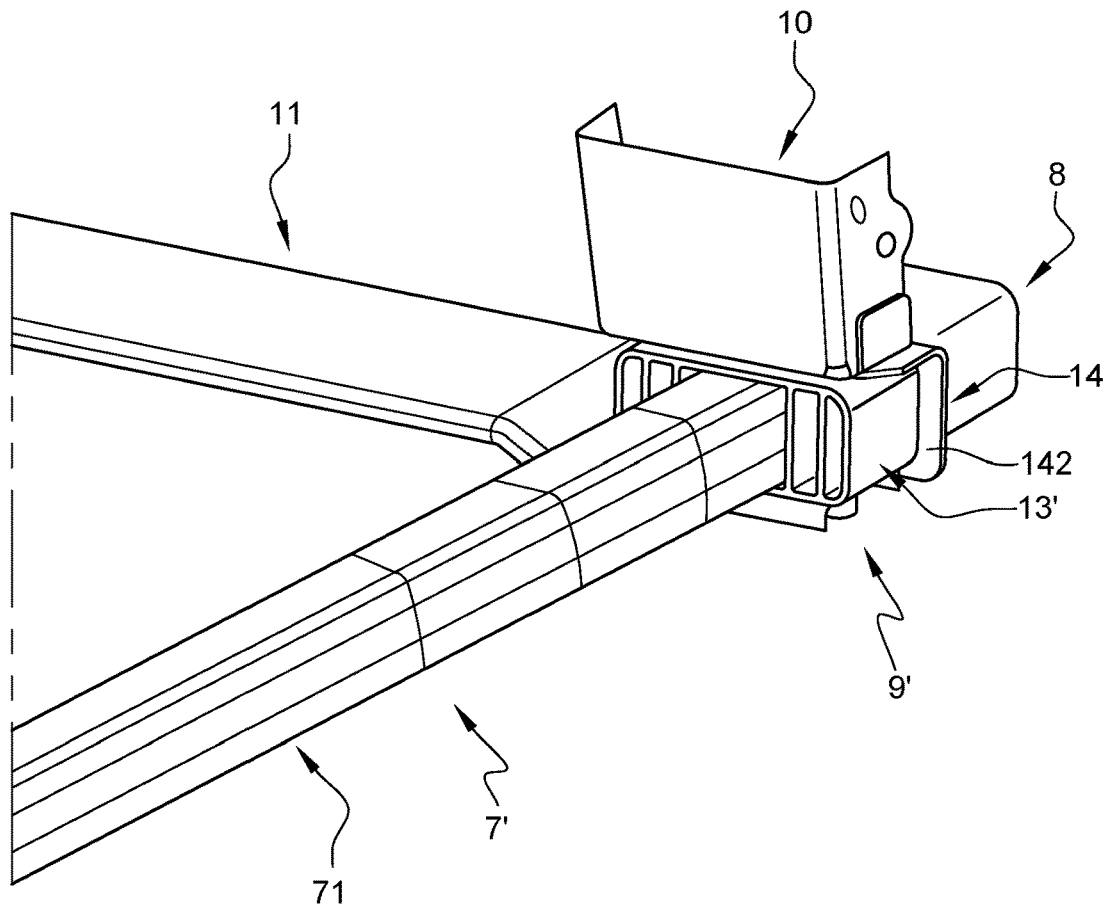
FIG. 11 is a rear perspective view from above of the structural components node of the second embodiment of the invention.

Referring to FIGS. 10 and 11, the second embodiment of the invention differs from the first embodiment only by the structural configuration of the crash extender connector 13' of the crash extender 7'. The main difference concerns the fact that the crash extender connector 13' does not comprise any rear plate nor associated securing tab. This crash extender connector 13' then comprises a top plate 131', which is in surface contact with the top wall 711 of the hollow body 71 of the crash extender 7', a lower plate 132' in surface contact with the lower wall 712 of the hollow body 71 of the crash extender 7', and two internal opposite transverse plates 133', 134' defining with the opposite transverse walls 713, 714 of the hollow body 71 two opposite locking volumes 14a', 14b', each locking volume 14a', 14b' receiving one fastening device 15, 16 whose functionalities are the same as in the first embodiment. The crash extender connector 13' can optionally comprise, in a particular embodiment, as shown on FIGS. 10 and 11, two external opposite transverse plates 136', 137' defining with the two internal opposite transverse plates 133', 134' two opposite external volumes 14c', 14d'. Advantageously, said transverse plates 136' and 137' increase the structural strength of the crash extender 13'.

In a particular embodiment, as illustrated on FIG. 10, the crash extender connector 13' and the hollow body 71 are optionally secured together with fastening devices 22, such as for example nails, which can cross the top plate 131' of the crash extender connector 13' and the top wall 711 of the hollow body 71, and/or the the lower plate 132' of the crash extender connector 13' and the lower wall 712 of the hollow body 71. Because the crash extender connector 13' does not comprise a front plate 135 on which the front end 7a of the crash extender connector would naturally come to rest during the assembly process, pre-securing the crash extender connector 13' to the hollow body 71 by using fastening devices 22 allows for a more robust and precise assembly process.

As illustrated on FIG. 11, the resulting structural components node 9' of the second embodiment is arranged as for the structural components node 9 of the first embodiment except that, in the absence of rear plate for the crash extender connector, the front plate 142 of the crash box 14 is in surface contact with the rear edge of the crash extender connector 13' and on the free edge of the hollow body 71' of the crash extender 7'.

Figure 12:
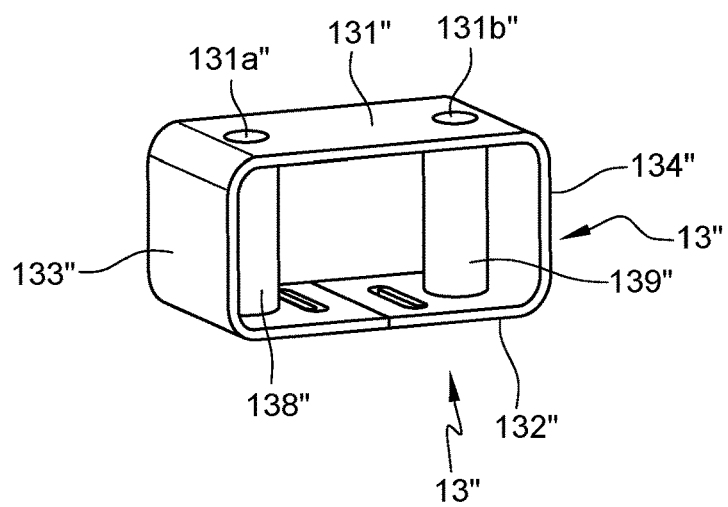
FIG. 12 is a perspective view of the crash extender connector of a third embodiment of the invention.
Figure 13:
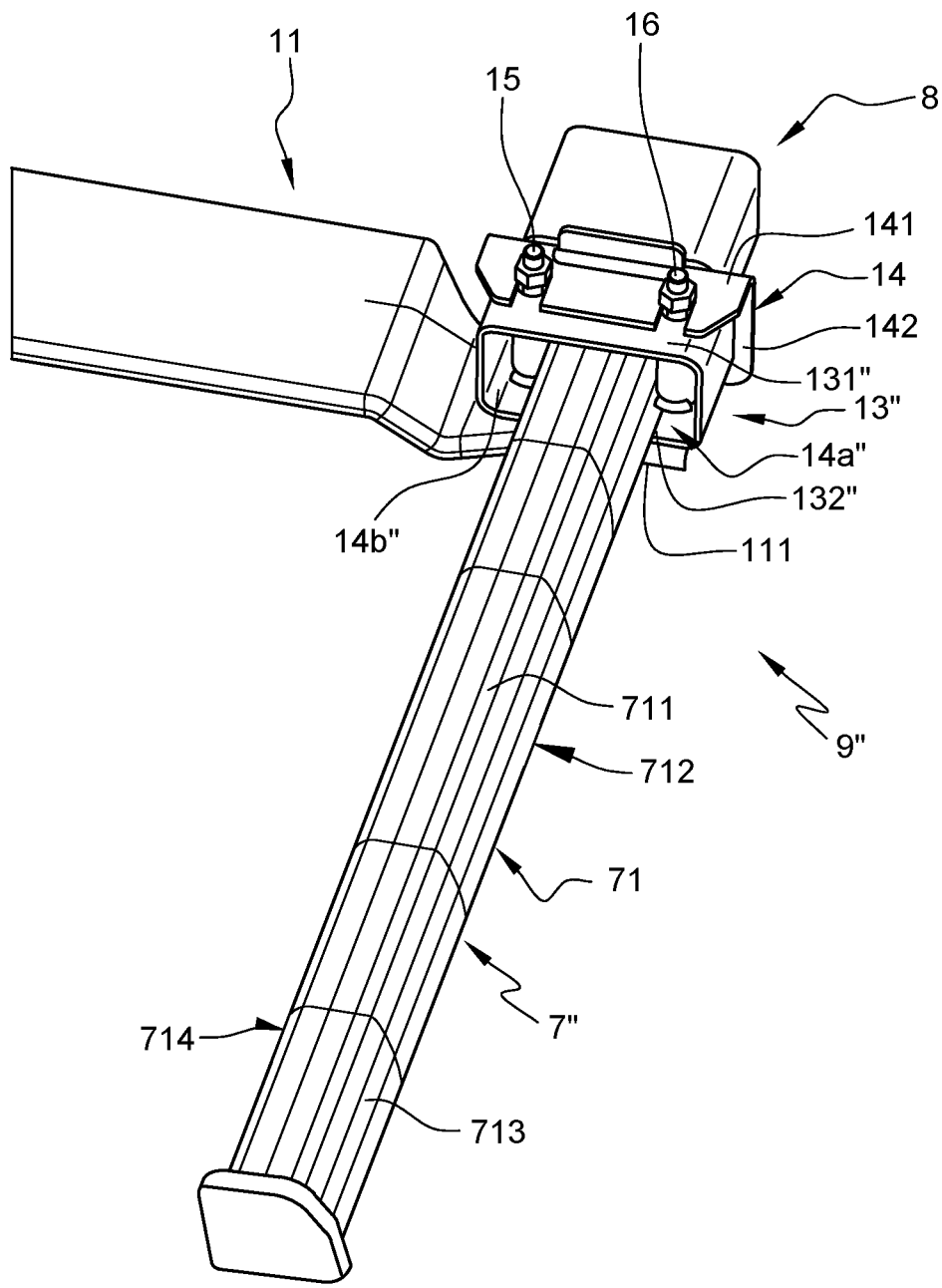
FIG. 13 is is a rear perspective view from above of the structural components node of the third embodiment of the invention.

Referring to FIGS. 12 and 13, the third embodiment of the invention differs also from the first embodiment of the invention only by the structural configuration of the crash extender connector 13" of the crash extender 7". As for the second embodiment, the main difference concerns the fact that the crash extender connector 13' does not comprise any rear plate nor associated securing tab. This crash extender connector 13" comprises a top plate 131", which is in surface contact with the top wall 711 of the hollow body 71 of the crash extender 7", a lower plate 132" in surface contact with the lower wall 712 of the hollow body 71 of the crash extender 7", and two opposite transverse plates 133", 134" defining with the opposite transverse walls 713,714 of the hollow body 71 two opposite locking volumes 14a", 14b", each locking volume 14a", 14b" receiving at least one fastening device 15, 16 whose functionalities are the same as in the first embodiment.

In this embodiment, the crash extender connector 13" further comprises two vertical tubular guides 138", 139" in communication with the holes 131a", 132a" of the top plate 131" of the crash extender connector 13" and the holes (not visible on the figures) of the lower plate 132" of the crash extender connector 13". Such tubular guides are configured to receive the fastening devices 15, 16 which cross the front plate 141 of the crash box connector 14, the front plate 131" of the crash extender connector 13", the lower plate 132" of the crash extender connector 13" and the ending plate 111 of the transverse front cross member 11 (FIG. 13).

As illustrated on FIG. 13, the resulting structural components node 9" of the second embodiment (the hanger is not illustrated on this figure) is arranged as for the structural components node 9' of the second embodiment in that the front plate 142 of the crash box 14 is in surface contact on the rear edge of the crash extender connector 13" and on the free edge of the hollow body 71' of the crash extender 7'.

The process of assembling the structural components node 9', 9" of the second and third embodiment is the same as for the process of assembling the structural components node 9 of the first embodiment.

The invention claimed is:

1. A structural components node comprising:
   a crash box extending longitudinally from a front end capable of being secured to a transverse cross-member to a rear end; and
   a crash extender extending from a rear end capable of being secured to a suspension cradle to a front end secured to the crash box, the crash extender comprising a hollow body delimited by a top wall, a lower opposite wall and two opposite transverse walls, the rear end of the crash box including a crash box connector comprising a rear plate facing a front free edge of the hollow body of the crash extender, and a top plate substantially perpendicular to the rear plate and in surface contact on and secured to a cooperating top plate of a crash extender connector located at the front end of the crash extender, the top plate of the crash extender connector being in surface contact on the top wall of the hollow body of the crash extender, the crash extender connector further including a lower plate in surface contact with the lower wall of the hollow body of the crash extender.

2. The structural components node as recited in claim 1 wherein the crash extender connector including two opposite transverse plates defining with the corresponding opposite transverse walls of the hollow body of the crash extender two opposite locking volumes, each locking volume receiving at least one fastener crossing at least the top plate of the crash box connector, and the cooperating top plate and the lower plate of the crash extender connector.

3. The structural components node as recited in claim 1 wherein the crash extender connector further includes a front plate substantially perpendicular to the cooperating top plate and facing the front free edge of the hollow body of the crash extender and in surface contact on the rear plate of the crash box connector.

4. The structural components node as recited in claim 3 wherein the front plate of the crash extender connector includes a securing tab extending in a same plane as the front plate beyond the lower wall of the hollow body of the crash extender, the securing tab being in surface contact with and secured to a cooperating securing tab extending in a same plane as the rear plate of the crash box connector.

5. The structural components node as recited in claim 4 wherein the securing tabs of both the crash extender connector and the crash box connector each include a coaxial hollowing-out receiving a fastener crossing and securing both securing tabs.

6. The structural components node as recited in claim 1 further comprising a hanger extending substantially perpendicular to both top plates of the corresponding crash extender connector and crash box connector, from a top end able to be secured to a front rail, to a lower end including a lower plate in surface contact with and secured to the two top plates.

7. The structural components node as recited in claim 6 further comprising a transverse front cross member extending substantially perpendicular to the crash box, the crash extender and the hanger, from a first lateral end capable of being secured to a second structural components node located at the lateral opposite side of the motor vehicle lower load path, to a second opposite lateral end including an ending plate in surface contact with and secured to the lower plate of the crash extender connector.

8. The structural components node as recited in claim 2 further comprising a hanger extending substantially perpendicular to both top plates of the corresponding crash extender connector and crash box connector, from a top end able to be secured to a front rail, to a lower end including a lower plate in surface contact with and secured to the two top plates, and a transverse front cross member extending substantially perpendicular to the crash box, the crash extender and the hanger, from a first lateral end capable of being secured to a second structural components node located at the lateral opposite side of the motor vehicle lower load path, to a second opposite lateral end including an ending plate in surface contact with and secured to the lower plate of the crash extender connector, and
   wherein the two opposite locking volumes receive at least one fastener crossing and securing the top plate of the crash box connector, the top plate and the lower plate of the crash extender connector, the lower plate of the lower end of the hanger and the ending plate of the lateral end of the transverse front cross member.

9. A method for assembling a structural components node, the method comprising:
   providing and positioning a transverse front cross member;
   providing and positioning a rear end of a crash extender in a suspension cradle, and a lower plate of a crash extender connector next to an ending plate of a lateral end of the transverse front cross member;

providing and positioning a lower plate of a lower end of a hanger next to a top plate of the crash extender connector;

pre-fastening the crash extender connector, the lower plate of the lower end of the hanger and the ending plate of the lateral end of the transverse front cross member with fasteners extending through two opposite locking volumes of the crash extender connector;

providing and positioning a crash box connector next to the crash extender connector, a top plate of the crash box connector being located between the lower plate of the lower end of the hanger and the top plate of the crash extender connector; and fastening the crash extender connector, the lower plate of the lower end of the hanger, the ending plate of the lateral end of the transverse front cross member and the crash box connector with the fastening devices extending through the two opposite locking volumes of the crash extender connector.

10. The method as recited in claim 9 further comprising fastening securing tabs of the crash extender connector and of the crash box connector.

11. A motor vehicle comprising at least one structural components node as recited in claim 1.

12. The motor vehicle as recited in claim 11 wherein the at least one structural components node includes two opposite structural components nodes each located at the lateral opposite side of a motor vehicle lower load path.

* * * * *